United States Patent
Kim et al.

(10) Patent No.: US 6,961,497 B2
(45) Date of Patent: Nov. 1, 2005

(54) OPTICAL POWER SPLITTER HAVING A STABILIZING WAVEGUIDE

(75) Inventors: Heu-Gon Kim, Seoul (KR); Sung-Hyun Lee, Kyonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 156 days.

(21) Appl. No.: 10/303,228

(22) Filed: Nov. 25, 2002

(65) Prior Publication Data

US 2003/0133662 A1 Jul. 17, 2003

(30) Foreign Application Priority Data

Jan. 14, 2002 (KR) .......................................... 2002-2147

(51) Int. Cl.[7] .............................................. G02B 6/42
(52) U.S. Cl. ............................. 385/48; 385/43; 385/45; 385/28
(58) Field of Search ................................ 385/43–48, 28

(56) References Cited

U.S. PATENT DOCUMENTS

| | | | | |
|---|---|---|---|---|
| 4,400,055 A | * | 8/1983 | Ozeki et al. | .................. 385/43 |
| 5,048,909 A | * | 9/1991 | Henry et al. | .................. 385/27 |
| 5,058,978 A | * | 10/1991 | Kondoh et al. | ................ 385/43 |

(Continued)

FOREIGN PATENT DOCUMENTS

| EP | 0484878 | 11/1991 | ............ G02B/6/12 |
|---|---|---|---|
| EP | 0737872 | 3/1996 | ............ G02B/6/12 |
| EP | 1128193 | 2/2000 | ............ G02B/6/12 |

OTHER PUBLICATIONS

Japanese Publication No. 04–213407; Kito Tsutomu et al.; "Branching/Multiplexing Optical Waveguide Circuit," Aug. 4, 1992; 9 pages.

Japanese Publication No. 04–172308; Nakama Kenichi et al.; "Y–Branched Light Circuit;" Jun. 19, 1992; 6 pages.

(Continued)

*Primary Examiner*—Ellen E. Kim
(74) *Attorney, Agent, or Firm*—Cha & Reiter, L.L.C.

(57) ABSTRACT

An optical power splitter is provided that can stably operate even when there is a mode mismatch between an input optical signal and the optical power splitter. The optical power splitter of the present invention includes a semiconductor substrate, an optical waveguide stacked on the semiconductor substrate, and a clad surrounding the optical waveguide. The optical waveguide includes an input waveguide section through which the optical signal is input from an outer waveguide, a tapered waveguide section having a gradually increasing width, first and second waveguide branches extending from an output end of the tapered waveguide section and outputting first and second branched optical signals, and a stabilizing waveguide section disposed between the input waveguide section and the tapered waveguide section, the stabilizing waveguide section having length and width capable of stabilizing shaking of the optical signal which is generated by a mode mismatch between the optical signal and the input waveguide section.

11 Claims, 15 Drawing Sheets

U.S. PATENT DOCUMENTS

| | | | | |
|---|---|---|---|---|
| 5,408,556 | A | * | 4/1995 | Wong .......................... 385/48 |
| 5,438,640 | A | * | 8/1995 | Sasaoka et al. ............... 385/43 |
| 5,586,209 | A | * | 12/1996 | Matsuura et al. ............. 385/45 |
| 5,745,619 | A | * | 4/1998 | Li et al. ........................ 385/48 |
| 5,799,119 | A | * | 8/1998 | Rolland et al. ............... 385/28 |
| 5,838,853 | A | * | 11/1998 | Jinnai et al. .................. 385/50 |
| 5,864,644 | A | * | 1/1999 | DiGiovanni et al. .......... 385/43 |
| 5,949,931 | A | * | 9/1999 | Kitamura ..................... 385/28 |
| 6,236,782 | B1 | * | 5/2001 | Kewitsch et al. ............. 385/43 |
| 6,434,302 | B1 | * | 8/2002 | Fidric et al. .................. 385/43 |
| 6,542,670 | B1 | * | 4/2003 | Takahashi et al. ............ 385/45 |
| 2003/0133663 | A1 | * | 7/2003 | Orignac et al. ............... 385/45 |

OTHER PUBLICATIONS

Japanese Publication No. 09–005549; Hattori Tetsuya et al.; "Optical Circuit and Method for Manufacturing the Same;" Jan. 10, 1997; 12 pages.

Japanese Publication No. 08–292340; Klekamp Axel Dr; "Optical Branch;" Nov. 5, 1996; 6 pages.

"An Improved Single Mode Y–Branch Design for Cascaded 1:2 Splitters;" A. Klekamp et al.; Journal of Lightwave Technology; vol. 14, No. 12; Dec. 1996; XP000642257; 3 pages.

"Lossless 1X2 Optical Switch Monolithically Integrated on a Passive Active Resonant Coupler (PARC) Platform;" S. S. Sani et al.; IEEE Photonics Technology Letters; vol. 12, No. 7; Jul. 2000; XP000968682; 3 pages.

"Integrated Optic Adiabatic Polarization Splitter on Silicon;" Yosi Shani et al.; Applied Physics Letters; vol. 56, No. 2; Jan. 8, 1990; XP000307457; 2 pages.

* cited by examiner

OPTICAL POWER SPLITTER HAVING A STABILIZING WAVEGUIDE

CLAIM OF PRIORITY

This application claims priority to an application entitled "OPTICAL POWER SPLITTER HAVING A STABILIZING WAVEGUIDE," filed in the Korean Industrial Property Office on Jan. 14, 2002 and assigned Ser. No. 2002-2147, the contents of which are hereby incorporated by reference.

BACKGROUND OF THE INVENTION

1. Field of the Invention

The present invention relates to a planar waveguide device, and more particularly to an optical power splitter utilizing a Y-branch optical waveguide.

2. Description of the Related Art

An optical waveguide device includes an optical waveguide core through which an optical signal is transmitted by experiencing total internal reflection in the optical waveguide core, and a clad surrounding the optical waveguide core. Representative examples of optical waveguide devices include a planar waveguide device fabricated in a semiconductor manufacturing process and an optical fiber manufactured by melting an optical fiber preform. Planar waveguide devices include optical power splitter/couplers that divide or couple the power of the optical signal and wavelength division multiplexer/demultiplexers that multiplex or demultiplex channels constituting the optical signal according to wavelengths of the optical signal. Further, the optical power splitter may include a tapered waveguide, that enlarges field distribution of an input optical signal, and a Y-branch optical waveguide having a pair of output waveguide branches, that splits the enlarged optical signal and outputs it through ends of the output waveguide branches.

FIG. 1 is a schematic plan view of a conventional optical power splitter utilizing a Y-branch optical waveguide. The conventional optical power splitter 100 generally includes an input section 101, a branching section 102, and an output section 103. Further, the optical power splitter 100 is constructed so that both sides are symmetric with reference to an axis 230 of the optical power splitter 100.

The input section 101 includes an input waveguide section 110. The input waveguide section 110 receives an optical signal through its input end connected with an outer waveguide 250 and controls the device length of the optical power splitter 100.

In this case, in order to minimize the coupling loss of the optical signal, the input waveguide section 110 has a width 104 that can optimize the mode field diameter (MFD) of the outer waveguide 250 and the mode field diameter of the input waveguide section 110 and that enables single-mode propagation and low-loss insertion of the optical signal. That is, in order to minimize the coupling loss of the optical signal, the input waveguide section 110 enlarges the field distribution of the optical signal and functions as a coupling section that enables single-mode propagation and low-loss insertion of the optical signal. In this case, the outer waveguide 250 is a waveguide that constitutes an optical fiber or a planar waveguide device.

The branching section 102 includes a first tapered waveguide section 140, and first and second waveguide branches 150 and 160.

The first tapered waveguide section 140 receives the optical signal through its input end connected with the input waveguide section 110, and the width of the first tapered waveguide section 140 gradually increases in the direction toward which the optical signal propagates.

The first and second waveguide branches 150 and 160 extend from the output end of the first tapered waveguide section 140 symmetrically with reference to the axis 230.

The output section 103 includes second and third auxiliary waveguide sections 170 and 200, second and third tapered waveguide sections 180 and 210, and first and second output waveguide sections 190 and 220.

The second auxiliary waveguide section 170 controls the device length of the optical power splitter 100 and connects the first waveguide branch 150 and the second tapered waveguide section 180 with each other.

The second tapered waveguide section 180 receives a first branched optical signal through its input end connected with the second auxiliary waveguide section 170, and the width of the second tapered waveguide section 180 gradually increases in the direction toward which the first branched optical signal propagates.

The first output waveguide section 190 receives the first branched optical signal through its input end and outputs the first branched optical signal through its output end.

The third auxiliary waveguide section 200 controls the device length of the optical power splitter 100 and connects the second waveguide branch 160 to the third tapered waveguide section 210.

The third tapered waveguide section 210 receives a second branched optical signal through its input end connected with the third auxiliary waveguide section 200, and the width of the third tapered waveguide section 210 gradually increases in the direction toward which the second branched optical signal propagates.

The second output waveguide section 220 receives the second branched optical signal through its input end and outputs the second branched optical signal through its output end.

FIGS. 2A and 2B are graphs describing the mode matching in the case where an optical signal is input in alignment with the axis of the optical power splitter 100, that is, the case where the optical signal is input into the optical power splitter 100 in such a manner that the field distribution of the optical signal has a shape both sides of which are symmetric with reference to the axis 230.

The graph shown in FIG. 2A shows a first field distribution 310 in the input waveguide section 110 at the input end of the input waveguide section 110, which means a field distribution of the optical signal propagating through the input waveguide section 110 directly after passing the input end of the input waveguide section 110. As shown, the first field distribution 310 is arranged symmetrically with reference to the axis 230. This mode matching maximizes the coupling efficiency between the input waveguide section 110 and the optical signal.

The graph shown in FIG. 2B shows a third field distribution 320 in the first tapered waveguide section 140 and a fourth field distribution 330 in the first and second waveguide ranches 150 and 160, at the output end of the first tapered waveguide section 140. As shown, the first field distribution 310 and the fourth field distribution 330 are arranged symmetrically with reference to the axis 230. These mode matches maximize the coupling efficiency of the optical signal between the first tapered waveguide section 140 and the first and second waveguide branches 150 and 160.

FIG. 3 is a view showing an intensity distribution of the optical signal propagating through the optical power splitter 100 in the mode match state. In FIG. 3, sections 301, 302, and 303 represent the intensity distributions of the input section 101, branching section 102, and output section 103, respectively.

FIGS. 4A and 4B are graphs illustrating mode mismatch in the case where an optical signal is input in misalignment with the axis 230 of the optical power splitter 100. That is, these figures illustrate the case where the optical signal is input into the optical power splitter 100 in such a manner that the field distribution of the optical signal has a shape in which the sides are nonsymmetrical with reference to the axis 230.

The graph illustrated in FIG. 4A shows a fifth field distribution 340 in the input waveguide section 110 at the input end of the input waveguide section 110. As shown, a center line of the fifth field distribution 340 is not aligned with the axis 230. This mode mismatch degrades the coupling efficiency between the input waveguide section 110 and the optical signal.

The graph illustrated in FIG. 4B shows a sixth field distribution 350 in the first tapered waveguide section 140 and a seventh field distribution 360 in the first and second waveguide branches 150 and 160, at the input end of the first tapered waveguide section 140. As shown, the center lines of the sixth field distribution 350 and the seventh field distribution 360 are not aligned with each other. This mode mismatch degrades the coupling efficiency between the first tapered waveguide section 140 and the first and second waveguide branches 150 and 160.

FIG. 5 illustrates an intensity distribution of an optical signal propagating through the optical power splitter 100 in the mode mismatch state. In FIG. 5, sections 304, 305, and 306 represent the intensity distributions of the input section 101, branching section 102, and output section 103, respectively. As shown, the optical signal shakes while passing through the input section 101, thereby having an effect on the branching section B, which consequently causes the mode mismatch as shown in FIG. 4B.

FIG. 6 is a graph illustrating loss corresponding to the mode mismatch of the optical signal input to the optical power splitter 100, and FIG. 7 is a graph illustrating uniformity according to the mode mismatch of the optical signal input to the optical power splitter 100.

FIG. 6 illustrates a first output curve 370 representing the output of the first output waveguide section 190 according to the mode mismatch of the optical signal and a second output curve 380 representing the output of the second output waveguide section 220 according to the mode mismatch of the optical signal. As shown in FIG. 6, as the mode mismatch grows larger, the difference of the outputs between the first output curve 370 and the second output curve 380 becomes significantly larger.

FIG. 7 illustrates a uniformity curve 390 representing the difference between the outputs of the first and second output waveguide sections 190 and 220 according to the mode mismatch of the optical signal. As shown, the difference between the outputs of the first and second output waveguide sections 190 and 220 abruptly increases as the mode mismatch increases.

As described above, the conventional optical power splitter utilizing a Y-branch optical waveguide is problematic in that, the larger the mode mismatch, the larger the difference between the outputs of the first and second output waveguide sections 190 and 220. Moreover, the difference between the outputs of the first and second output waveguide sections 190 and 220 according to the mode mismatch of the optical signal further increases when the optical signal is a multi-channel signal.

SUMMARY OF THE INVENTION

Thus, there is a need for an optical splitter that minimizes the difference in outputs when there is mode mismatch. The present invention provides an optical power splitter 400 that can operate stably even when there is a mode mismatch between an input optical signal and the optical power splitter.

Referring now to FIG. 8, the present invention is an optical power splitter 400 comprising a semiconductor substrate, an optical waveguide stacked on the semiconductor substrate, and a clad surrounding the optical waveguide. In a preferred embodiment of the present invention, the optical waveguide functions as a medium through which an optical signal transmits, the signal having a plurality of channels according to wavelengths. The optical waveguide comprises several components. At the input is an input waveguide section 410 through which the optical signal is input from an outer waveguide 550. Connected to the input waveguide section 410 is a tapered waveguide section 440 that gradually increases in width. First 450 and second 460 waveguide branches in a branching section 403 extend from an output end of the tapered waveguide section 440 and output first and second branched optical signals. A stabilizing waveguide section 430 is disposed between the input waveguide section 410 and the tapered waveguide section 440, the stabilizing waveguide section having a length 407 and a width 406 capable of being preset to values which enable stabilizing of a shaking of the optical signal that is generated by a mode mismatch between the optical signal and the input waveguide section 410.

DETAILED DESCRIPTION OF THE PREFERRED EMBODIMENT

Figure 1:
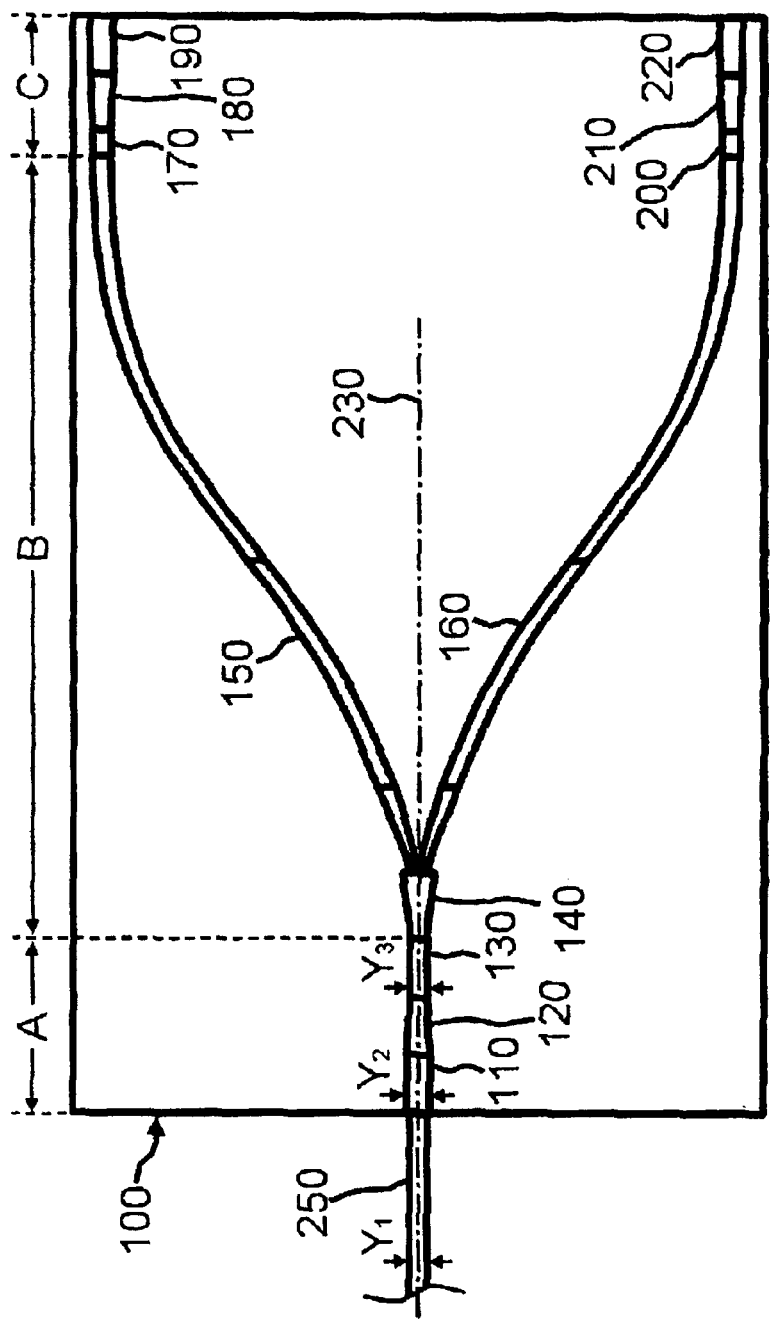
FIG. 1 is a schematic plan view of a prior art optical power splitter utilizing a Y-branch optical waveguide.
Figure 2A:
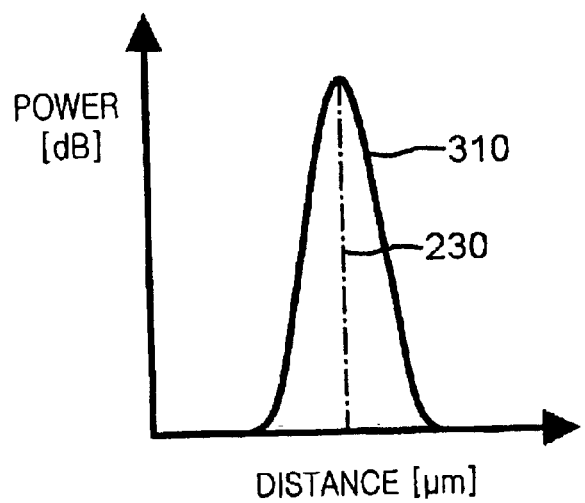
FIGS. 2A and 2B illustrate graphs that describe the mode matching in the case where an optical signal is input in alignment with the axis of the optical power splitter shown in FIG. 1.
Figure 2B:
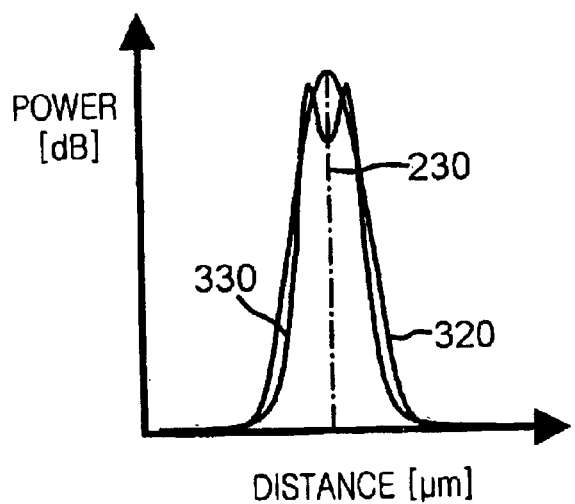
Figure 3:
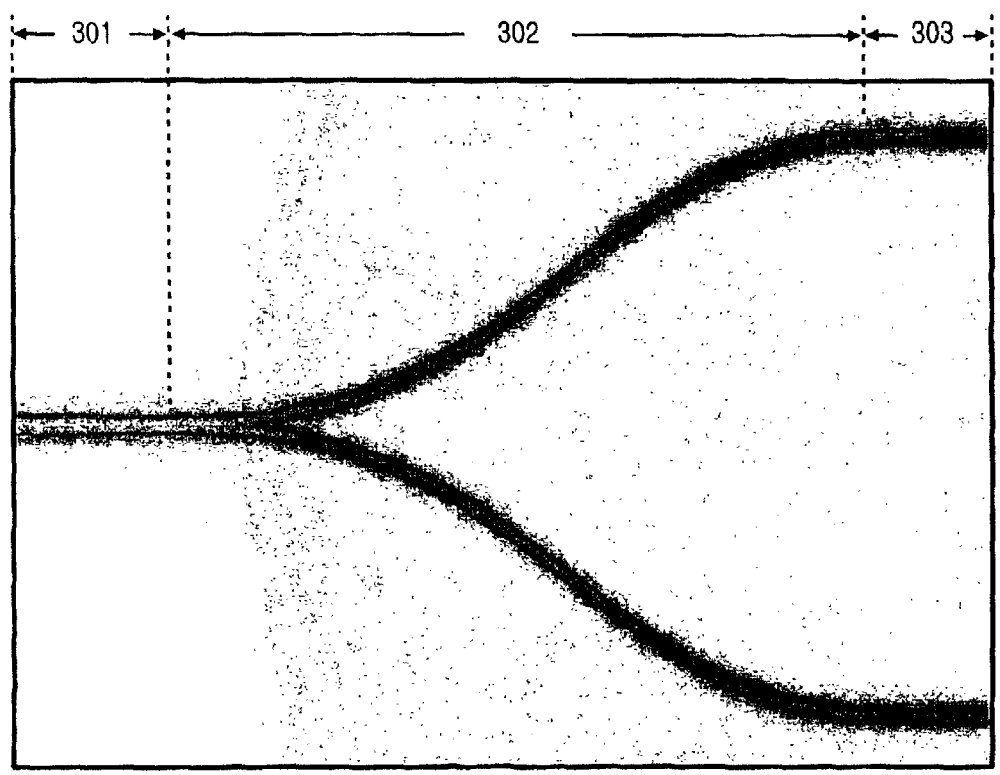
FIG. 3 is an illustration of an intensity distribution of the optical signal propagating through the optical power splitter shown in FIG. 1 in a mode mismatch state.
Figure 4A:
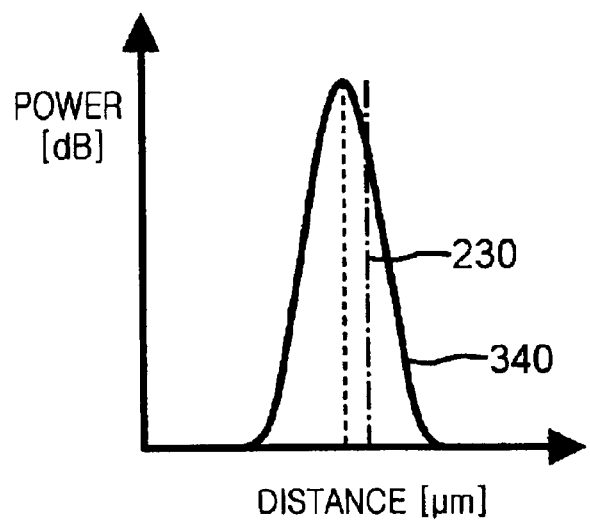
FIGS. 4A and 4B are graphs that describe mode mismatch in the case where an optical signal is input in misalignment with the axis of the optical power splitter shown in FIG. 1.
Figure 4B:
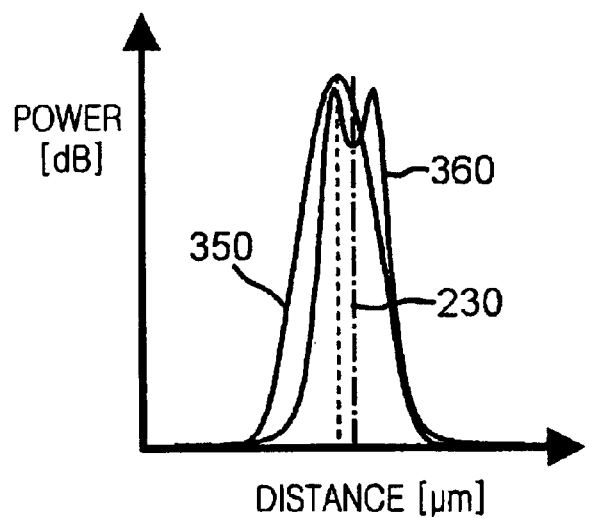
Figure 5:
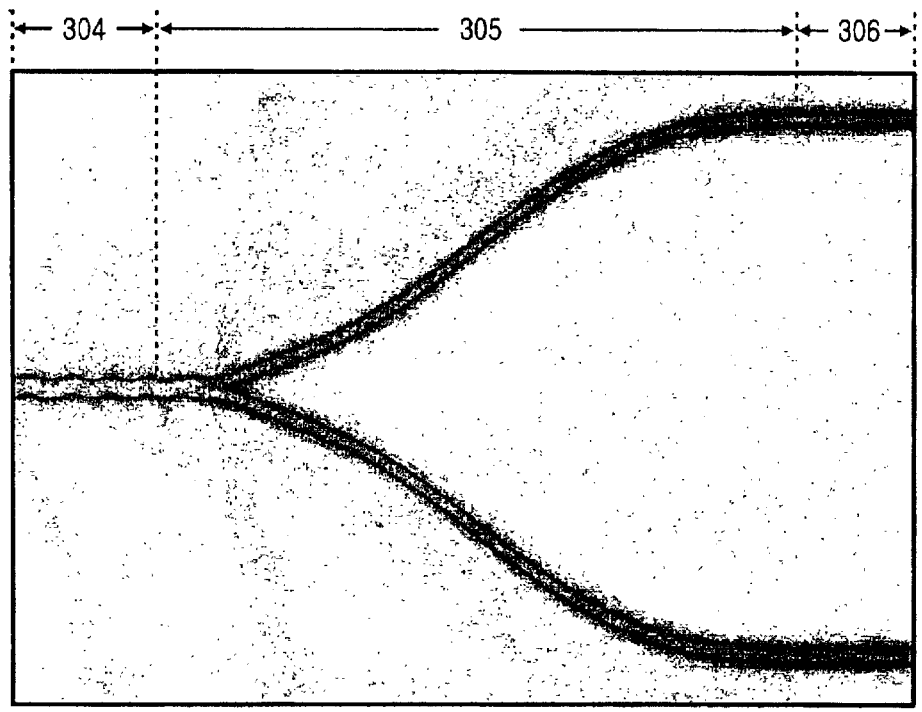
FIG. 5 illustrates an intensity distribution of the optical signal propagating through the optical power splitter shown in FIG. 1 in a mode mismatch state.
Figure 6:
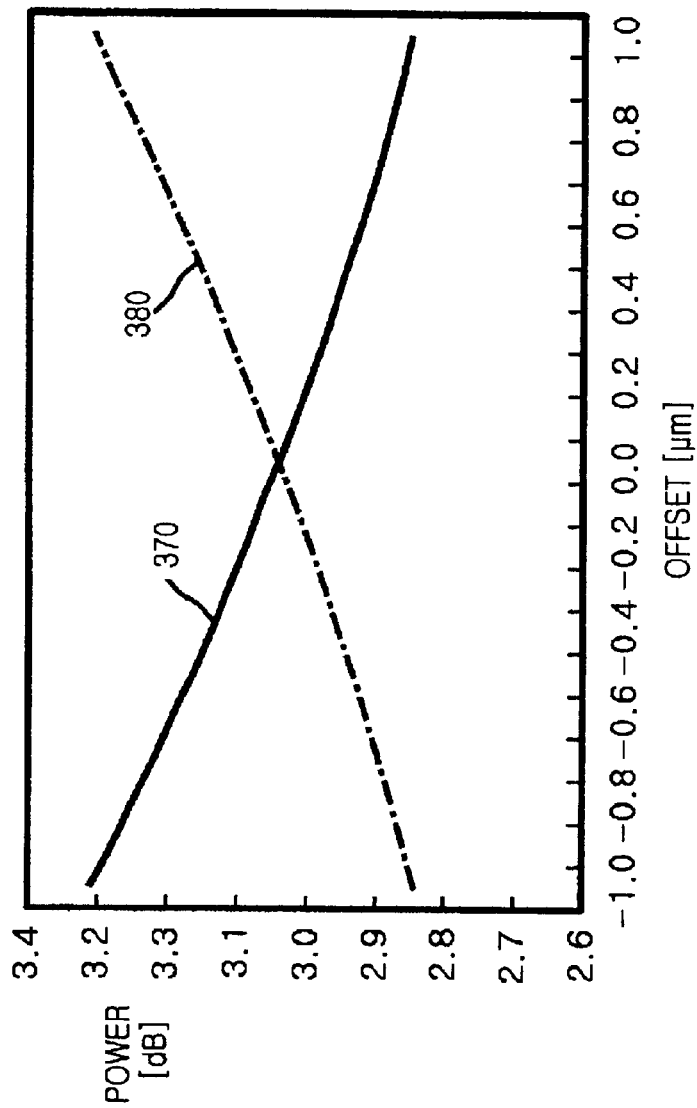
FIG. 6 is a graph illustrating the loss according to the mode mismatch of the optical signal input to the optical power splitter shown in FIG. 1.
Figure 7:
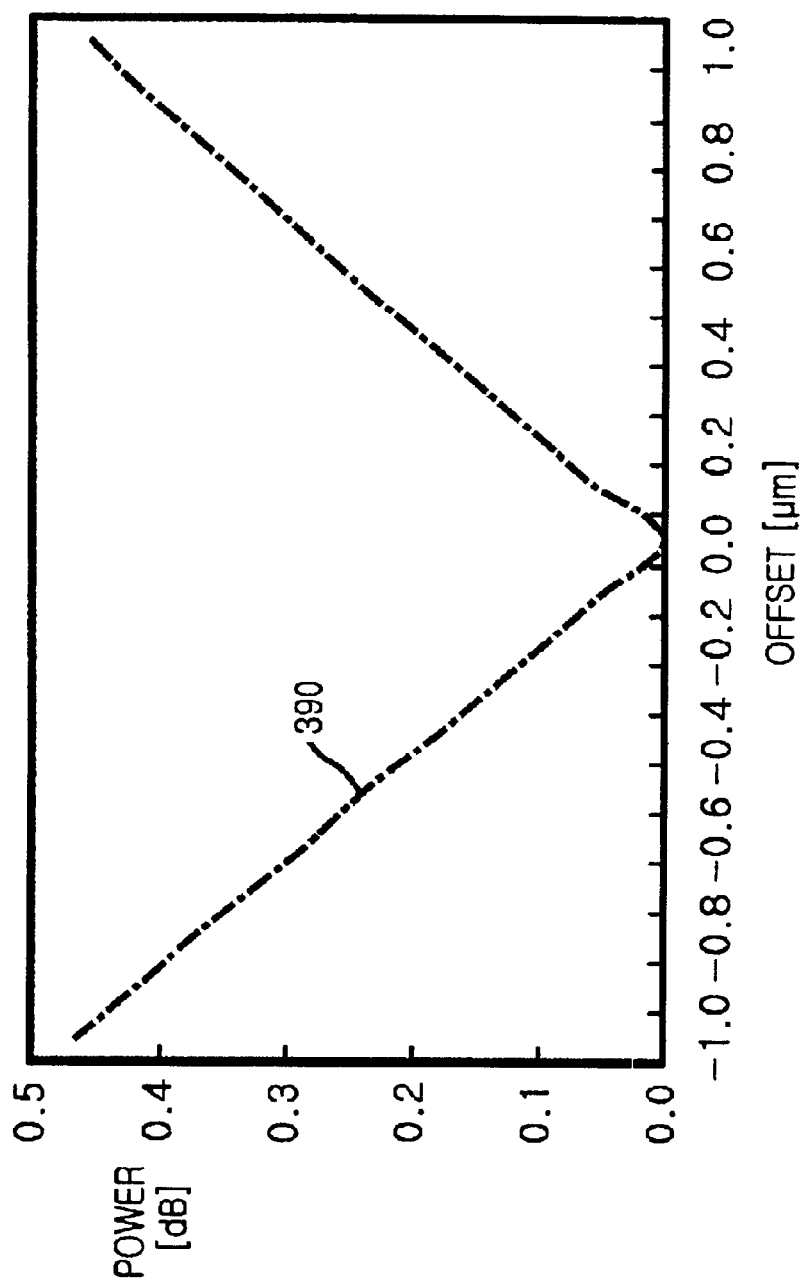
FIG. 7 is a graph illustrating uniformity according to the mode mismatch of the optical signal input to the optical power splitter shown in FIG. 1.
Figure 8:
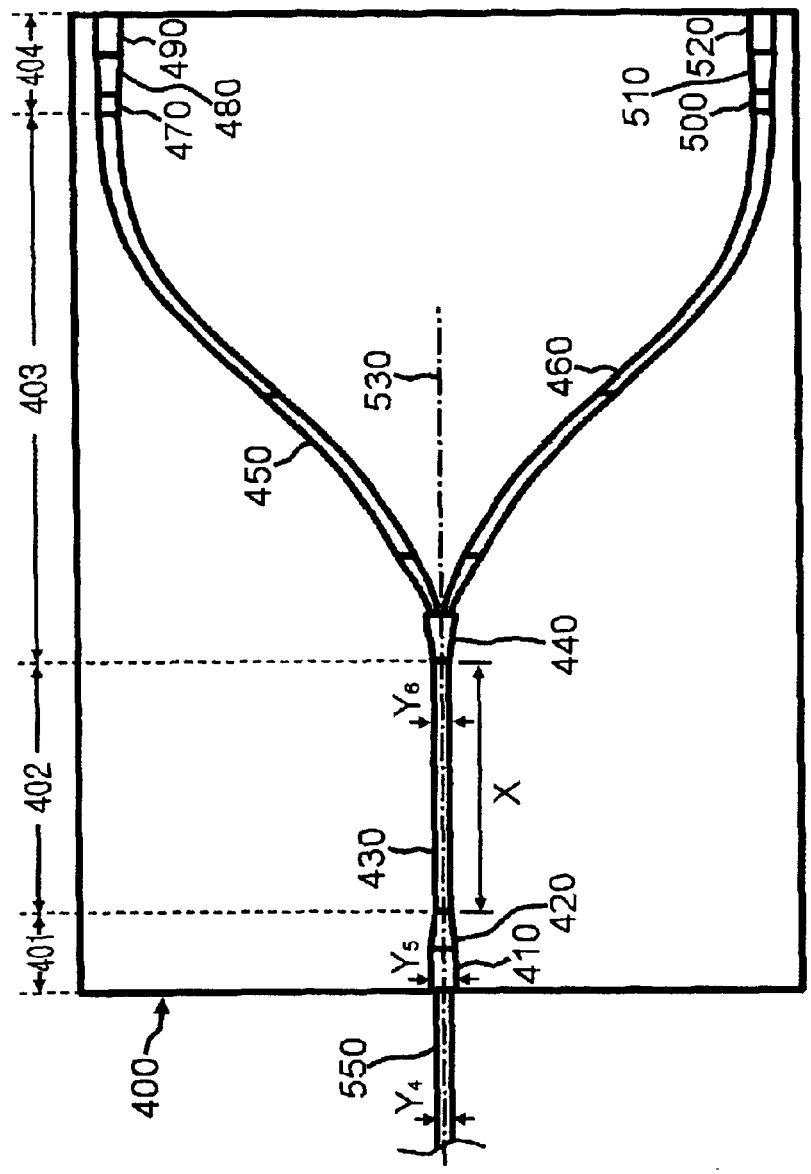
FIG. 8 illustrates an optical power splitter utilizing a Y-branch optical waveguide according to a preferred embodiment of the present invention.

FIG. 8 illustrates an optical power splitter utilizing a Y-branch optical waveguide according to a preferred embodiment of the present invention. The optical power splitter 400 generally includes an input section 401, a stabilizing section 402, a branching section 403, and an output section 404. Further, the optical power splitter 400 has a construction both sides of which are symmetric with respect to axis 530 of the optical power splitter 400.

The input section 401 includes an input waveguide section 410 having width 405 and a first tapered waveguide section 420.

The input waveguide section 410 receives an optical signal through its input end that is connected with an outer waveguide 550. In a preferred embodiment, the input waveguide section 410 has characteristics of a single-mode propagation and low-loss insertion. The first tapered waveguide section 420 receives the optical signal through its input end connected with the input waveguide section 410, and the width of the first tapered waveguide section 420 gradually decreases in the direction toward which the optical signal propagates. In this case, in order to minimize the coupling loss of the optical signal, the input waveguide section 410 has a width 405 that optimizes mode field diameters of the outer waveguide 550 and the input waveguide section 410. In this case, the outer waveguide 550 is a waveguide that constitutes an optical fiber or a planar waveguide device.

The stabilizing section 402 comprises stabilizing waveguide section 430 having a predetermined width 406 and length 407.

The first tapered waveguide section 420 is disposed between the input waveguide section 410 and the stabilizing waveguide section 430. The coupling efficiency is highly dependent on alignment and the tapering of the first tapered waveguide section 420 gradually decreases its width thus allowing gradual confinement of the propagating light which relieves alignment concerns. The stabilizing waveguide section 430 is disposed between the first tapered waveguide section 420 that tapers increasingly and a second tapered waveguide section 440 that tapers decreasingly and has a width 406 and length 407 which in combination stabilize the shaking of the optical signal, which shaking may be generated due to mode mismatch between the optical signal and the input waveguide section 410. In a preferred embodiment, the width 406 of the stabilizing waveguide section 430 is smaller than the width 105 of 130, since the smaller the width 406 of the stabilizing waveguide section 430, within a predetermined limit, the greater the stabilization of the optical signal.

The branching section 403 includes the second tapered waveguide section 440, and a first and a second waveguide branche 450 and 460.

The second tapered waveguide section 440 receives the optical signal through its input end connected with the stabilizing waveguide section 430, and the width of the second tapered waveguide section 440 gradually increases in the direction toward which the optical signal propagates.

The first and second waveguide branches 450 and 460 extend from the output end of the second tapered waveguide section 440 symmetrically with reference to the axis 530.

The output section 404 includes a first and a second auxiliary waveguide section 470 and 500, a third and a fourth tapered waveguide section 480 and 510, and a first and a second output waveguide section 490 and 520.

The first auxiliary waveguide section 470 controls the device length of the optical power splitter 400 and links the first waveguide branch 450 and the third tapered waveguide section 480 with each other.

The third tapered waveguide section 480 receives a first branched optical signal through its input end connected with the first auxiliary waveguide section 470, and the width of the third tapered waveguide section 480 gradually increases in the direction toward which the first branched optical signal propagates.

The first output waveguide section 490 receives the first branched optical signal through its input end and outputs the first branched optical signal through its output end.

The second auxiliary waveguide section 500 controls the device length of the optical power splitter 400 and links the second waveguide branch 460 and the fourth tapered waveguide section 510 with each other.

The fourth tapered waveguide section 510 receives a second branched optical signal through its input end connected with the second auxiliary waveguide section 500, and the width of the fourth tapered waveguide section 510 gradually increases in the direction toward which the second branched optical signal propagates.

The second output waveguide section 520 receives the second branched optical signal through its input end and outputs the second branched optical signal through its output end.

Figure 9A:
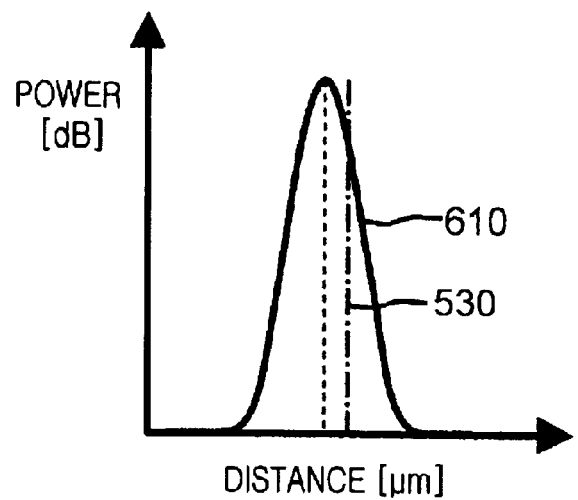
FIGS. 9A and 9B are graphs illustrating a process of stabilizing the field distribution of an optical signal in the case where the optical signal is input in misalignment with the axis of the optical power splitter shown in FIG. 8.
Figure 9B:
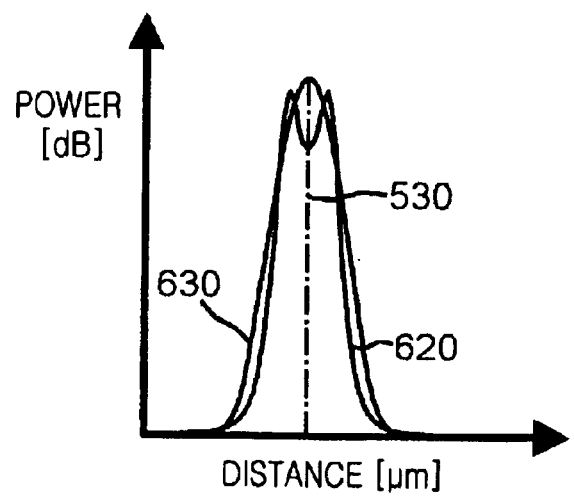

FIGS. 9A and 9B are graphs illustrating a process of stabilizing the field distribution of an optical signal in the case where the optical signal is input in misalignment with the axis 530 of the optical power splitter 400, that is, the case where the optical signal is input into the optical power splitter 400 in such a manner that the field distribution of the optical signal has a shape both sides of which are nonsymmetrical with reference to the axis 530.

The graph illustrated in FIG. 9A shows a first field distribution 610 in the input waveguide section 410 at the input end of the input waveguide section 410, which is a field distribution of the optical signal propagating through the input waveguide section 410 directly after passing through the input end of the input waveguide section 410. As shown, a center line of the first field distribution 610 is not aligned with the axis 530. This mode mismatch degrades the coupling efficiency between the input waveguide section 410 and the optical signal.

The graph illustrated in FIG. 9B shows a second field distribution 620 in the second tapered waveguide section 440 and a third field distribution 630 in the first and second waveguide branches 450 and 460, at the output end of the second tapered waveguide section 440. As shown, the second field distribution 620 and the third field distribution 630 are arranged symmetrically with reference to the axis 530. These mode matches maximize the coupling efficiency of the optical signal between the second tapered waveguide section 440 and the first and second waveguide branches 450 and 460.

Figure 10:
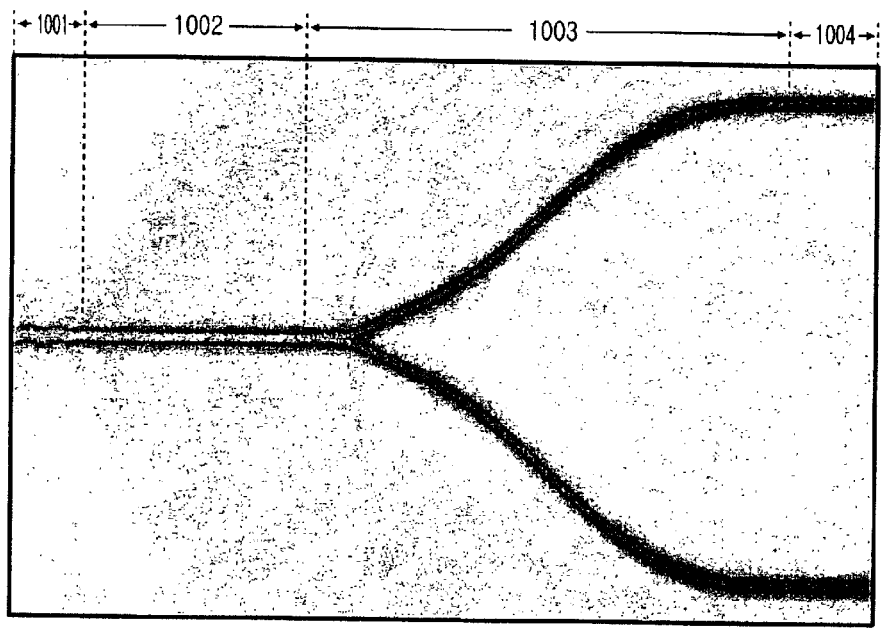
FIG. 10 illustrates an intensity distribution of the optical signal propagating through the optical power splitter shown in FIG. 8.

FIG. 10 illustrates an intensity distribution of the optical signal propagating through the optical power splitter 400. In FIG. 10, sections 1001, 1002, 1003, and 1004 represent the intensity distributions of the input section 401, stabilizing section 402, branching section 403, and output section 404, respectively. FIG. 10 illustrates the optical signal shaking while passing through the input section 401 but stably propagating through the stabilizing section 402. That is, the optical signal initially propagating while shaking is gradually stabilized while passing through the stabilizing section 402. This stabilization of the optical signal results in the mode match illustrated in FIG. 9B.

Figure 11:
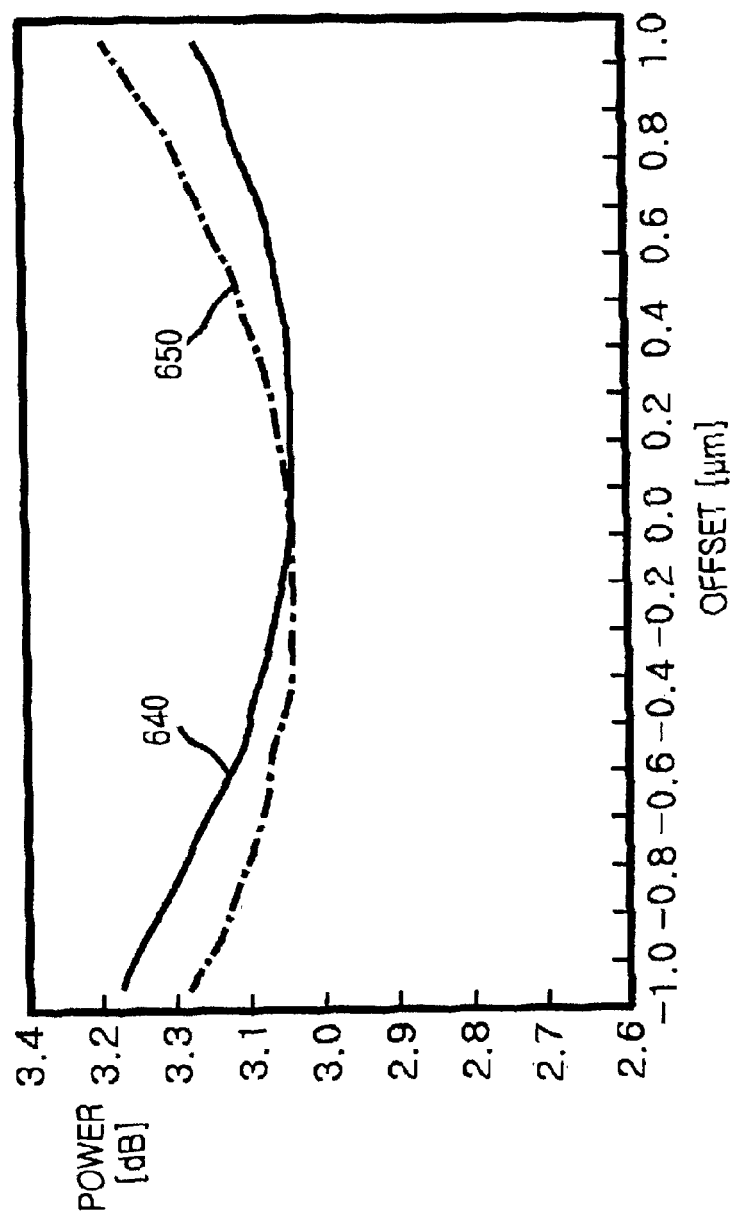
FIG. 11 is a graph illustrating the change of outputs according to the mode mismatch of the optical signal input to the optical power splitter shown in FIG. 8.
Figure 12:
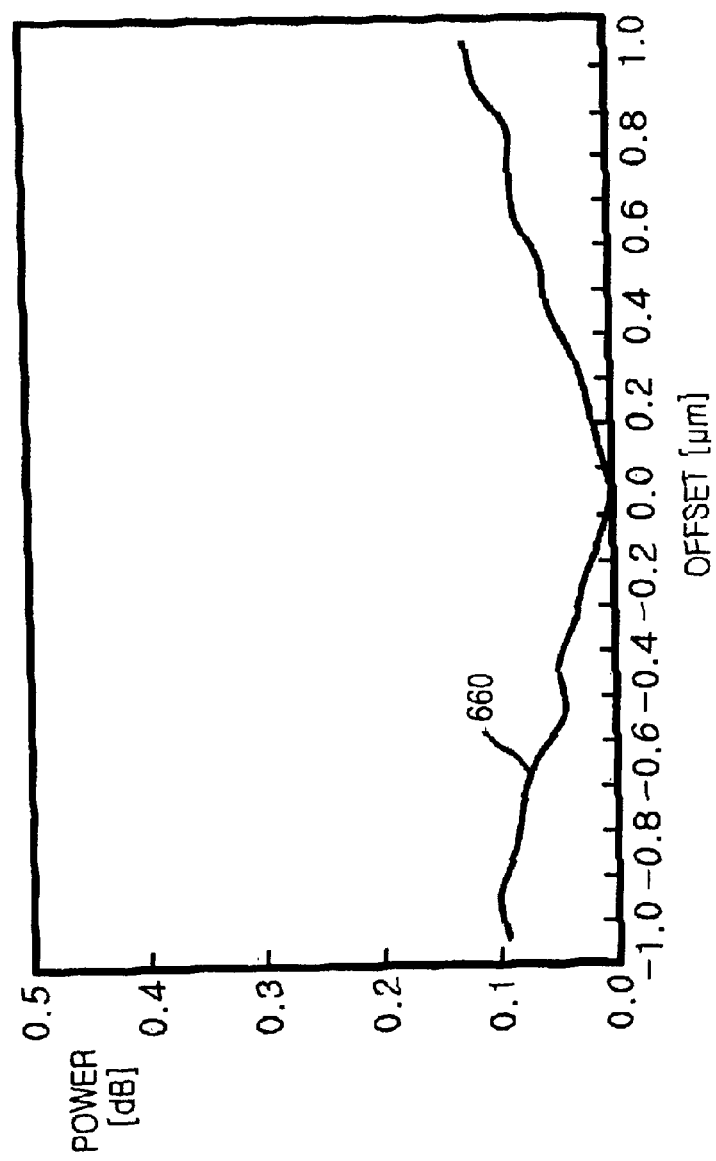
FIG. 12 is a graph illustrating the change of uniformity according to the mode mismatch of the optical signal input to the optical power splitter shown in FIG. 8.

FIG. 11 is a graph illustrating the change of outputs according to the mode mismatch of the optical signal input to the optical power splitter 400, and FIG. 12 is a graph illustrating the change of uniformity according to the mode mismatch of the optical signal input to the optical power splitter 400. In these cases, the stabilizing waveguide section 430 of the present invention has a width 406 of 3 $\mu$m and a length 407 of 2000 $\mu$m.

FIG. 11 shows a first output curve 640 representing the output of the first output waveguide section 490 according to the mode mismatch of the optical signal and a second output curve 650 representing the output of the second output waveguide section 520 according to the mode mismatch of the optical signal. As shown in FIG. 11, as the mode mismatch grows larger, the difference of the outputs shown by the first output curve 640 and the second output curve 650 becomes only slightly larger for an optical power splitter having a stabilizing waveguide according to the present invention.

FIG. 12 is a graph illustrating a first uniformity curve 660 representing the difference between the outputs of the first and second output waveguide sections 490 and 520 according to the mode mismatch of the optical signal. As shown in FIG. 12, the difference between the outputs of the first and second output waveguide sections 490 and 520 slightly increases as the mode mismatch increases for an optical power splitter having a stabilizing waveguide according to the present invention.

Figure 13:
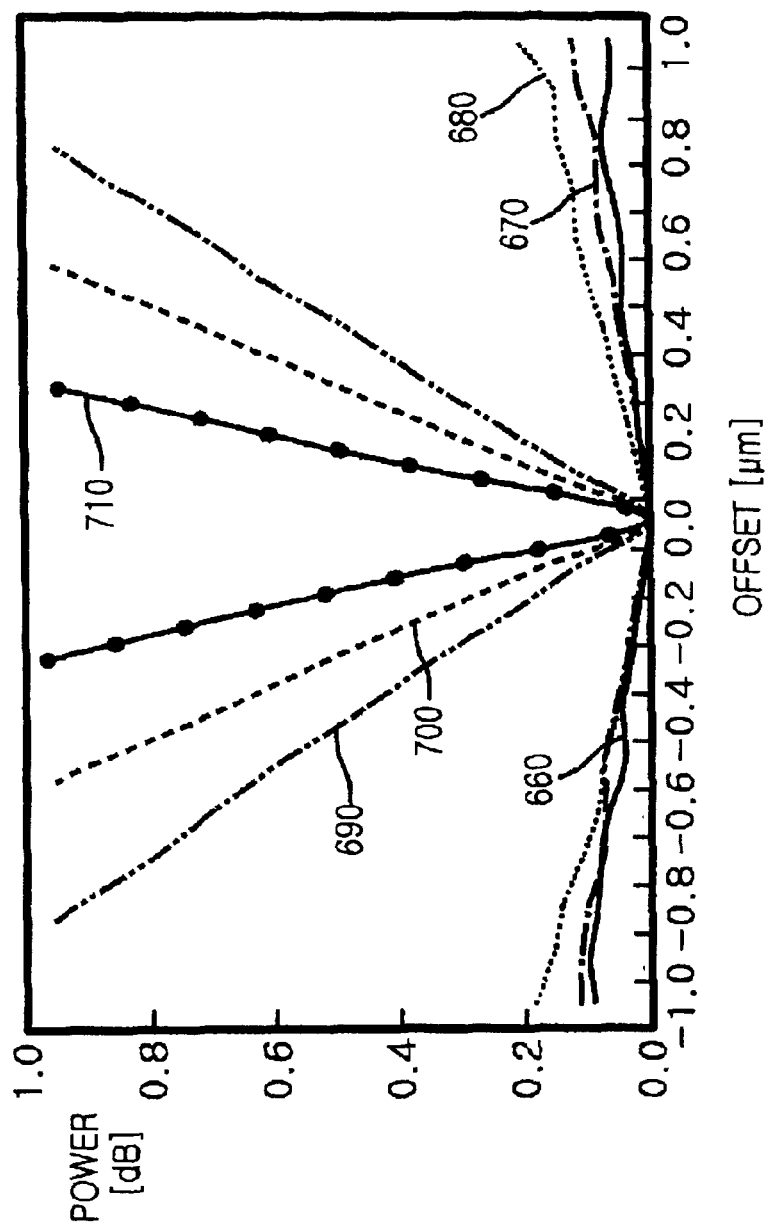
FIG. 13 is a graph illustrating the change of uniformity according to the mode mismatch of the optical signal input to the optical power splitter and the width of the stabilizing waveguide section shown in FIG. 8.

FIG. 13 is a graph illustrating the change of uniformity according to the mode mismatch of the optical signal input to the optical power splitter 400 and the width 406 of the stabilizing waveguide section 430. FIG. 13 shows first to sixth uniformity curves 660, 670, 680, 690, 700, and 710 representing the difference between the outputs of the first and second output waveguide sections 490 and 520 according to the mode mismatch of the optical signal, respectively. In FIG. 13, the first to sixth uniformity curves 660, 670, 680, 690, 700, and 710 represent the difference between the outputs of the first and second output waveguide sections 490 and 520 in the case where the width 406 of the stabilizing waveguide section 430 is 3 $\mu$m, 4 $\mu$m, 5 $\mu$m, 6 $\mu$m, 7 $\mu$m, and 8 $\mu$m, respectively. In each case, the length 407 of the stabilizing waveguide section 430 is 2000 $\mu$m.

FIG. 13 shows that the smaller the width 406 of the stabilizing waveguide section 430 according to the present invention, the smoother the corresponding uniformity curve.

Figure 14:
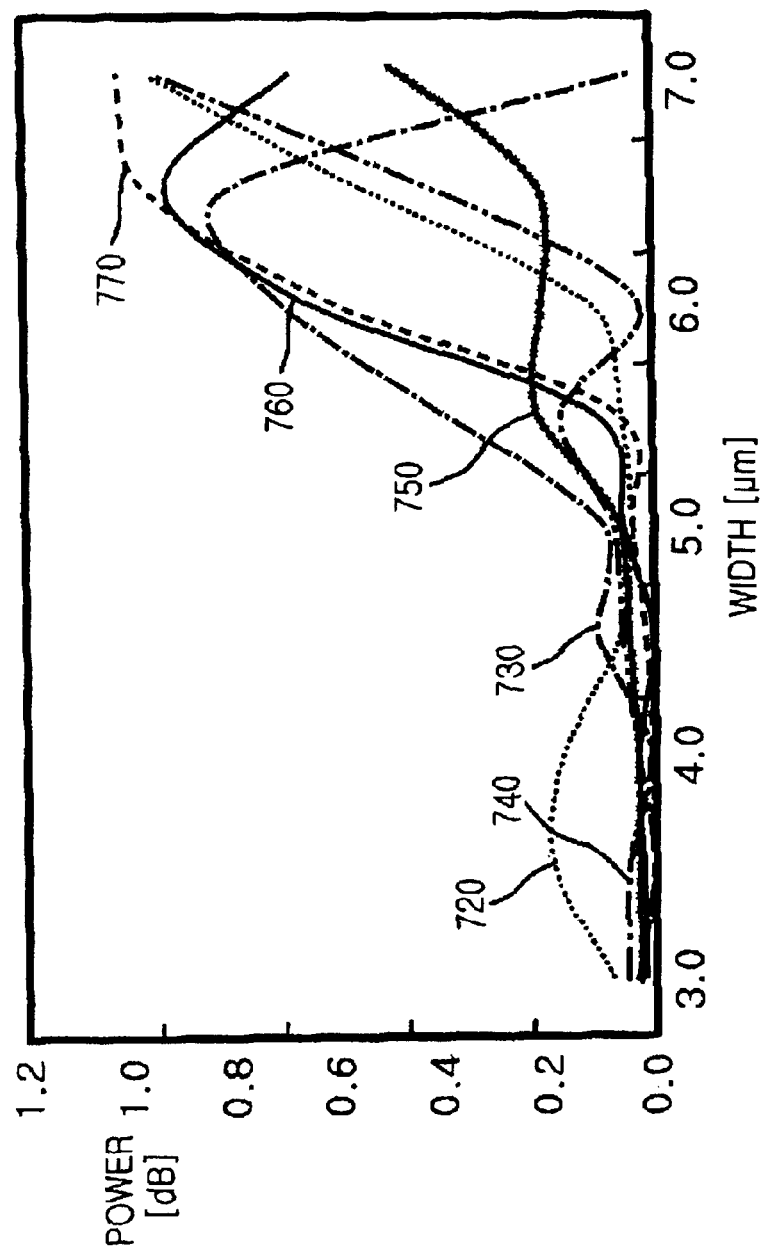
FIGS. 14 is a graph illustrating the change of uniformity according to the width of the stabilizing waveguide section shown in FIG. 8.
Figure 15:
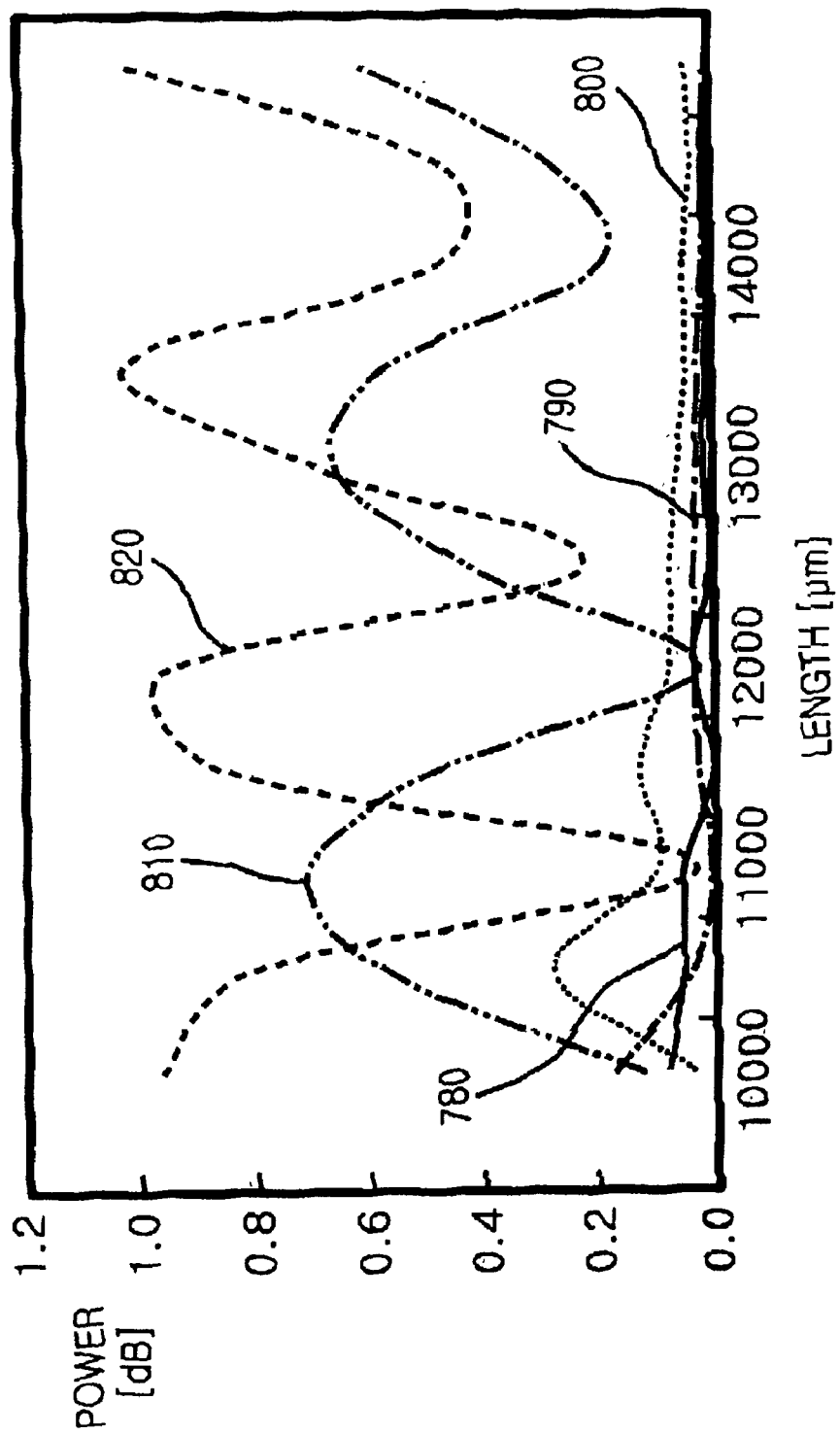
FIGS. 15 is a graph illustrating the change of uniformity according to the length of the stabilizing waveguide section shown in FIG. 8.

FIGS. 14 and 15 are graphs illustrating the change of uniformity according to the width 406 and length 407 of the stabilizing waveguide section 430 according to the present invention.

FIG. 14 shows seventh to twelfth uniformity curves 720, 730, 740, 750, 760, and 770 representing the difference between the outputs of the first and second output waveguide sections 490 and 520 according to the width 406 of the stabilizing waveguide section 430. In FIG. 14, the seventh to twelfth uniformity curves 720, 730, 740, 750, 760, and 770 represent the difference between the outputs of the first and second output waveguide sections 490 and 520 in the case where the length 407 of the stabilizing waveguide section 430 is 0 $\mu$m, 1000 $\mu$m, 2000 $\mu$m, 3000 $\mu$m, 4000 $\mu$m, and 5000 $\mu$m, respectively. In each case, the error in the mode matching of the optical signal is 0.3 $\mu$m. Thus, the smaller the width 406 of the stabilizing waveguide section 430 according to the present invention, the substantially smaller the difference between the outputs of the first and second output waveguide sections 490 and 520.

FIG. 15 illustrates thirteenth to seventeenth uniformity curves 780, 790, 800, 810, and 820 representing the difference between the outputs of the first and second output waveguide sections 490 and 520 according to the length 407 of the stabilizing waveguide section 430. In FIG. 15, the thirteenth to seventeenth uniformity curves 780, 790, 800, 810, and 820 represent the difference between the outputs of the first and second output waveguide sections 490 and 520 in the case where the width 406 of the stabilizing waveguide section 430 is 3 $\mu$m, 4 $\mu$m, 5 $\mu$m, 6 $\mu$m, and 7 $\mu$m, respectively. In each case, the error in the mode matching of the optical signal is 0.3 $\mu$m. FIG. 15 illustrates that the larger the length 407 of the stabilizing waveguide section 430 according to the present invention, the substantially smaller the difference between the outputs of the first and second output waveguide sections 490 and 520.

As described above, in an optical power splitter having a stabilizing wave guide according to the present invention, the width and length of the stabilizing wave guide can be adjusted, thereby enabling the optical power splitter to stably operate even when there is a mode mismatch between an input optical signal and the optical power splitter.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An optical power splitter comprising a semiconductor substrate, an optical waveguide stacked on the semiconductor substrate, and a clad surrounding the optical waveguide, the optical waveguide functioning as a medium through transmits which an optical signal having a plurality of channels according to wavelengths, the optical waveguide comprising:

an input waveguide section having a width through which the optical signal is inputted from an outer waveguide;

a first tapered waveguide section having a gradually increasing width; a second tapered waveguide section having a gradually decreasing width;

a first and second waveguide branch extending from an output end of the tapered waveguide section and outputting a first and second branched optical signal, respectively; and a stabilizing waveguide section disposed between the input waveguide section and the tapered waveguide section, the stabilizing waveguide section having a length and a width capable of stabilizing a shaking of the optical signal that is generated by a mode mismatch between the optical signal and the input waveguide section, wherein the second tapered waveguide section disposed between said input waveguide section and said stabilizing waveguide section, and the width of the stabilizing waveguide section is a value between 3 and 8 μm.

2. An optical power splitter as claimed in claim 1, wherein the width of the stabilizing waveguide section is smaller than the width of the input waveguide section, the input waveguide section having characteristics of a single-mode propagation and low-loss insertion.

3. An optical power splitter as claimed in claim 1, wherein the length of the stabilizing waveguide section is a value greater than zero and less than 2000 μm.

4. An optical power splitter as claimed in claim 1, wherein the width of the input waveguide section optimizes a mode field diameter of the outer waveguide and the input waveguide section.

5. An optical power splitter as claimed in claim 4, wherein the outer waveguide is one of an optical fiber and a planar waveguide device.

6. An optical waveguide for stabilizing an optical power splitter, the optical waveguide functioning as a medium through which transmits an optical signal having a plurality of channels according to wavelengths, the optical waveguide comprising:

an input section comprising an input waveguide having a predetermined width and a mode field, said mode field having a diameter, said input waveguide connected to an outer waveguide having a mode field;

a branching section comprising a Y-branch optical waveguide having a first and second branch, said first and second branch being symmetric with respect to an axis of the optical splitter; a tapered waveguide section having a gradually decreasing width and a stabilizing section comprising a stabilizing waveguide having a predetermined width and length and being disposed between the input section and the branching section, wherein the tapered waveguide section disposed between said input section and said stabilizing waveguide, and said stabilizing section is capable of stabilizing a shaking of the optical signal input to the input waveguide from the outer waveguide, said shaking being generated by a mode mismatch between the optical signal and the input waveguide.

7. An optical waveguide as claimed in claim 6, wherein the width of the stabilizing waveguide is a value between 3 and 8 μm.

8. An optical waveguide as claimed in claim 6, wherein the length of the stabilizing waveguide is a value greater than zero and less than 2000 μm.

9. An optical waveguide as claimed in claim 6, wherein:

said stabilizing waveguide has characteristics of a single-mode propagation and low-loss insertion; and said width of the stabilizing waveguide section is smaller than the width of the input waveguide.

10. An optical waveguide as claimed in claim 6, wherein the width of the input waveguide optimizes the mode field diameter of the outer waveguide and of the input waveguide.

11. An optical waveguide as claimed in claim 10, wherein the outer waveguide is one of an optical fiber and a planar waveguide device.

* * * * *